3,036,029
INTERPOLYMERS OF ALLYL ALCOHOL, VINYL CHLORIDE AND DIALKYL ESTERS OF ALPHA, BETA - ETHYLENICALLY UNSATURATED DI-CARBOXYLIC ACIDS, PROCESS FOR PREPARING SAME, AND BLENDS WITH FORMALDEHYDE CONDENSATION RESIN
Earl C. Chapin, Springfield, Mass., assignor to Monsanto Chemical Company, St. Louis, Mo., a corporation of Delaware
No Drawing. Filed Dec. 12, 1958, Ser. No. 779,869
11 Claims. (Cl. 260—45.2)

This invention relates to new terpolymer systems. More particularly, the invention relates to terpolymer systems containing alcohol groups.

One object of this invention is to provide polymeric systems containing alcohol groups.

Another object is to provide terpolymer systems containing chlorine atoms, ester groups and alcohol groups.

These and other objects are obtained by copolymerizing vinyl chloride, an allyl alcohol and a dialkyl ester of fumaric, maleic, itaconic, citraconic and mesaconic acids at elevated temperatures under autogenous pressure.

The following examples are given in illustration of the invention and are not intended as limitations thereof. Where parts are mentioned, they are parts by weight.

*Example I*

Mix together 30 parts of allyl alcohol monomer, 20 parts of vinyl chloride monomer, 50 parts of dibutyl fumarate monomer and 3 parts of ditertiarybutyl peroxide. Heat the mixture in a closed pressure vessel at a temperature of 120° C. for about 30 minutes. The product is a clear, nearly colorless syrup comprising terpolymer dissolved in unreacted monomers. Remove the unreacted monomers by vacuum distillation to obtain a clear, tough solid terpolymer soluble in hot xylene-butanol mixtures. The terpolymer contains about 10% of combined vinyl chloride by weight as determined by chlorine analysis. Infrared analysis indicates the presence of ester groups and primary hydroxyl groups in the terpolymer. Analysis for hydroxyl groups shows the terpolymer to contain about 6% by weight of hydroxyl groups, corresponding to an allyl alcohol content of about 20% by weight.

*Example II*

Mix together 30 parts of allyl alcohol monomer, 50 parts of vinyl chloride monomer, 20 parts of dibutyl maleate monomer and 3 parts of ditertiarybutyl peroxide. Heat the mixture in a closed pressure vessel at a temperature of 120° C. for about 2 hours. The product is a clear, nearly colorless syrup comprising terpolymer dissolved in unreacted monomers. Remove the unreacted monomers by vacuum distillation to obtain a clear, tough solid terpolymer soluble in hot xylene-butanol mixtures. The terpolymer contains about 25% of combined vinyl chloride by weight as determined by chlorine analysis. Infrared analysis indicates the presence of ester groups and primary hydroxyl groups in the terpolymer. Analysis for hydroxyl groups shows the terpolymer to contain about 4% by weight of hydroxyl groups, corresponding to an allyl alcohol content of about 13.5% by weight.

*Example III*

Mix together 30 parts of allyl alcohol monomer, 60 parts of vinyl chloride monomer, 10 parts of di-(2-ethylhexyl) fumarate monomer and 3 parts of ditertiarybutyl peroxide. Heat the mixture in a closed pressure vessel at a temperature of 120° C. for about 2 hours. The product is a clear, nearly colorless syrup comprising terpolymer dissolved in unreacted monomers. Remove the unreacted monomers by precipitation in excess methanol to obtain a clear, soft solid terpolymer soluble in xylene-butanol mixtures. The terpolymer contains about 40% of combined vinyl chloride by weight as determined by chlorine analysis. Infrared analysis indicates the presence of ester groups and primary hydroxyl groups in the terpolymer. Analysis for hydroxyl groups shows the terpolymer to contain about 3% by weight of hydroxyl groups, corresponding to an allyl alcohol content of about 10% by weight.

*Example IV*

Mix together 50 parts of allyl alcohol monomer, 30 parts of vinyl chloride and 20 parts of dibutyl fumarate and 3 parts of ditertiarybutyl peroxide. Heat the mixture in a closed pressure vessel at a temperature of 100° C. for about 20 hours. The product is a clear, nearly colorless syrup comprising terpolymer dissolved in unreacted monomers. Remove the unreacted monomers by precipitation in excess methanol to obtain a clear, soft solid terpolymer soluble in xylene-butanol mixtures. The terpolymer contains about 5% of combined vinyl chloride by weight as determined by chlorine analysis. Infrared analysis indicates the presence of ester groups and primary hydroxyl groups in the terpolymer. Analysis for hydroxyl groups shows the terpolymer to contain about 9% by weight of hydroxyl groups, corresponding to an allyl alcohol content of about 31% by weight.

The three components of the terpolymers of this invention are (1) allyl alcohol or methallyl alcohol or mixtures thereof (2) vinyl chloride and (3) a dialkyl ester of an alpha,beta-ethylenically unsaturated dicarboxylic acid. The allyl alcohol component may comprise from 5–40% by weight of the terpolymer, the vinyl chloride component from 5–60% by weight and the unsaturated dicarboxylic acid diester component from 2–70% by weight. The latter component comprises the dialkyl esters of fumaric, maleic, itaconic, citraconic and mesaconic acids wherein each alkyl group contains from 1–10 carbon atoms in a straight or branch chain. In place of the dibutyl fumarate, dibutyl maleate and di-(2-ethylhexyl) fumarate of the examples may be substituted, for example, dimethyl maleate, dimethyl itaconate, diethyl fumarate, diisopropyl maleate, dibutyl mesaconate, dibutyl citraconate, dipentyl fumarate, dihexyl fumarate, diisooctyl maleate, didecyl fumarate, etc. and mixtures thereof. The 4–8 carbon atom dialkyl esters of fumaric and maleic acids form a preferred embodiment of this invention in that the terpolymers obtained therewith possess an optimum combination of toughness and flexibility.

In preparing the terpolymers of this invention, the three types of monomeric components should be mixed together with a free radical initiator and the mixture should then be heated at a temperature of from 80–160° C. in a closed reaction vessel under autogenous pressure. Generally, the reaction mixture will comprise from 10–70 parts of the allyl alcohol component, from 5–60 parts of vinyl chloride and from 10–50 parts of the unsaturated dicarboxylic acid diester, all parts being parts by weight based upon 100 parts of total monomers. An excess of allyl alcohol, above the proportion thereof desired in the terpolymer, should be present in the monomeric mixture. The reaction should be run for from 15 minutes to 4 hours to obtain conversions ranging from 10–80% depending upon the conditions chosen. If desired, the monomers may be mixed with an inert solvent such as xylene before the polymerization step.

The polymerization reaction may be thermally initiated but it is preferred to use a free radical polymerization initiator such as ditertiarybutyl peroxide, ditertiarybutyl hydroperoxide, tertiarybutyl perbenzoate, pinacolone peroxide, hydrogen peroxide, etc. To be effective, the amount of initiator should be between about 0.1 part and 3 parts per 100 parts of total monomers.

The polymerization products are generally syrupy liquids which comprise a solution of the terpolymer dissolved in unreacted monomers and solvent if a solvent is used. The terpolymer is easily recovered from the syrup by removing unreacted monomers and solvent either by vacuum distillation or by precipitating the polymer in a non-solvent such as methanol. They contain from about 1.5 to about 10% hydroxyl groups by weight. Those containing from about 3 to 8% hydroxyl groups by weight are preferred.

The terpolymers range from hard and relatively rigid materials to soft, tough and flexible materials depending upon the particular unsaturated dicarboxylic acid diester employed and the relative proportions of the several components. Those terpolymers containing the dialkyl esters of fumaric or maleic acid wherein each alkyl group contains from 4–8 carbon atoms are preferred in that they provide an optimum degree of flexibility and hardness for most surface coating applications.

The products of this invention are particularly useful in coating compositions as a main resin constituent thereof, with relatively minor amounts of other coating resins such as alkyd resins, phenol-, urea- and melamine-formaldehyde coating resins, epoxy resins, etc. The terpolymers may also be used in relatively small amounts as modifiers for other coating resins. Furthermore, they may be esterified with drying oil acids to produce resins which will air-dry. Among the most valuable coating compositions are the resins of this invention mixed with a minor amount of a methylol melamine ether.

*Example V*

Prepare a 50% solids by weight solution of the terpolymer of Example I dissolved in a 1:1 xylene-butanol mixture and a 50% solids by weight solution of a trimethylol melamine butyl ether dissolved in a 1:1 xylene-butanol mixture. Mix together 4 parts of the terpolymer solution and 1 part of the melamine ether solution to obtain a clear homogeneous solution. From this solution, cast a film on a clean glass plate, dry the film in air at room temperature for a few minutes, e.g., 20 minutes, and then heat the film at 150° C. for about 20 minutes. The cured film is hard, clear and insoluble in aromatic solvents and in 10% aqueous sodium hydroxide solution.

Various pigments, fillers, dyes and other conventional additives may be added to the solutions such as that of Example IV to yield coating compositions. Other organic solvents than xylene-butanol mixtures may be used, e.g., ketones such as cyclohexanone and methyl ethyl ketone, aromatic hydrocarbons such as toluene and mixtures of xylene or toluene with aliphatic alcohols such as methanol, etc.

It is obvious that many variations may be made in the products and processes of this invention without departing from the spirit and scope thereof.

What is claimed is:

1. A terpolymer consisting of vinyl chloride, an allyl alcohol component and a dialkyl ester of an alpha,beta-ethylenically unsaturated dicarboxylic acid component; the amount of vinyl chloride in the terpolymer varying between 5–60% by weight, the amount of the allyl alcohol component in the terpolymer varying between 5–40% by weight and the amount of the dialkyl ester of an alpha, beta-ethylenically unsaturated dicarboxylic acid component in the terpolymer varying between 2–70% by weight; said allyl alcohol component being a member of the group consisting of allyl and methallyl alcohols and mixtures thereof and said dialkyl ester of an alpha,beta-ethylenically unsaturated dicarboxylic acid component being a member of the group consisting of the dialkyl esters of fumaric, maleic, itaconic, citraconic and mesaconic acids wherein each alkyl group contains from 1–10 carbon atoms and mixtures thereof.

2. A terpolymer as in claim 1 wherein the allyl alcohol component is allyl alcohol.

3. A terpolymer as in claim 1 wherein the dialkyl ester of an alpha,beta-ethylenically unsaturated dicarboxylic acid is dibutyl fumarate.

4. A terpolymer as in claim 1 wherein the dialkyl ester of an alpha,beta-ethylenically unsaturated dicarboxylic acid is dibutyl maleate.

5. A terpolymer as in claim 1 wherein the dialkyl ester of an alpha,beta-ethylenically unsaturated dicarboxylic acid is di-(2-ethylhexyl) fumarate.

6. A terpolymer as in claim 1 wherein the allyl alcohol component is allyl alcohol and the dialkyl ester of an alpha,beta-ethylenically unsaturated dicarboxylic acid is dibutyl fumarate.

7. A terpolymer as in claim 1 wherein the allyl alcohol component is allyl alcohol and the dialkyl ester of an alpha,beta-ethylenically unsaturated dicarboxylic acid is dibutyl maleate.

8. A terpolymer as in claim 1 wherein the allyl alcohol component is allyl alcohol and the dialkyl ester of an alpha,beta-ethylenically unsaturated dicarboxylic acid is di-(2-ethylhexyl) fumarate.

9. A process for preparing a terpolymer of vinyl chloride, an allyl alcohol component and a dialkyl ester of an alpha,beta-unsaturated dicarboxylic acid component which comprises mixing the monomeric components together in the proportions of from 5–60 parts of vinyl chloride, from 10–70 parts of the allyl alcohol component and from 10–50 parts of the dialkyl ester of an alpha,beta-ethylenically unsaturated dicarboxylic acid component, all parts being parts by weight per 100 parts of total monomers, and heating the mixture at from 80–160° C. under autogenous pressure; said allyl alcohol component being a member of the group consisting af allyl and methallyl alcohols and mixtures thereof and said dialkyl ester of an alpha,beta-ethylenically unsaturated dicarboxylic acid component being a member of the group consisting of the dialkyl esters of fumaric, maleic, itaconic, citraconic and mesaconic acids wherein each alkyl group contains from 1–10 carbon atoms and mixtures thereof.

10. A coating composition comprising an organic solvent solution of (1) a thermosetting resin taken from the group consisting of phenol-, urea- and melamine-formaldehyde condensation products and (2) a terpolymer of claim 1.

11. A coating composition as in claim 10 wherein the thermosetting resin is a butylated melamine-formaldehyde condensation product.

References Cited in the file of this patent

UNITED STATES PATENTS

| | | |
|---|---|---|
| 2,384,880 | Britton et al. | Sept. 18, 1945 |
| 2,600,681 | Park et al. | June 17, 1952 |
| 2,862,912 | Ott | Dec. 2, 1958 |
| 2,897,174 | Chapin et al. | July 28, 1959 |

FOREIGN PATENTS

| | | |
|---|---|---|
| 590,035 | Great Britain | July 7, 1947 |